United States Patent [19]

Riis

[11] Patent Number: 4,708,172
[45] Date of Patent: Nov. 24, 1987

[54] DEVICE AT MIXING VALVES

[75] Inventor: Voldemar Riis, Vårgårda, Sweden

[73] Assignee: Vargarda Armatur AB, Vårgårda, Sweden

[21] Appl. No.: 911,665

[22] Filed: Sep. 23, 1986

[30] Foreign Application Priority Data

Sep. 25, 1985 [SE] Sweden .............................. 8504429

[51] Int. Cl.⁴ ..................... F16K 11/078; F16K 51/00
[52] U.S. Cl. .............. 137/625.17; 137/625.4; 251/285; 251/288
[58] Field of Search .......... 137/625.17, 625.4, 625.41; 251/284, 285, 288

[56] References Cited

U.S. PATENT DOCUMENTS

| | | | |
|---|---|---|---|
| 3,122,756 | 3/1964 | Bradley | 251/285 X |
| 3,324,884 | 6/1967 | Dornaus | 137/625.17 |
| 3,674,048 | 7/1972 | Manoogian et al. | 251/288 X |
| 3,807,453 | 4/1974 | Dom et al. | 137/625.17 |
| 4,089,347 | 5/1978 | Christo | 251/285 X |
| 4,200,596 | 4/1980 | Iiyama | 251/285 X |
| 4,610,272 | 9/1986 | Gottwald et al. | 137/625.17 |

Primary Examiner—Alan Cohan
Assistant Examiner—John Rivell
Attorney, Agent, or Firm—Cushman, Darby & Cushman

[57] ABSTRACT

A device at mixing valves for liquids for example hot and cold water, and of the kind that comprises a valve housing (11), which is provided with an outlet (21) and an inlet (20) for each of the liquids, an operating member (13) for regulating the amount and temperature of the liquid flowing out through the outlet, the operating member being designed as a double-armed lever rotatable about a vertical as well as a horizontal axle (16) and the longer arm of which consists of a handle extending outside the housing (11) and the shorter arm of which consists of an actuator (15) arranged inside the housing, arranged to co-operate with a valve member (18), at which said actuator is provided with a stop part (23) co-operating with a stop face (24) for limiting the maximum out flow of liquid. In order to permit a temporary increase of the flow in excess of the maximum outflow set the stop part (23) consists a resilient tongue which when tightened against the stop face (24) is arranged to spring and permit an increase of the outflow.

1 Claim, 1 Drawing Figure

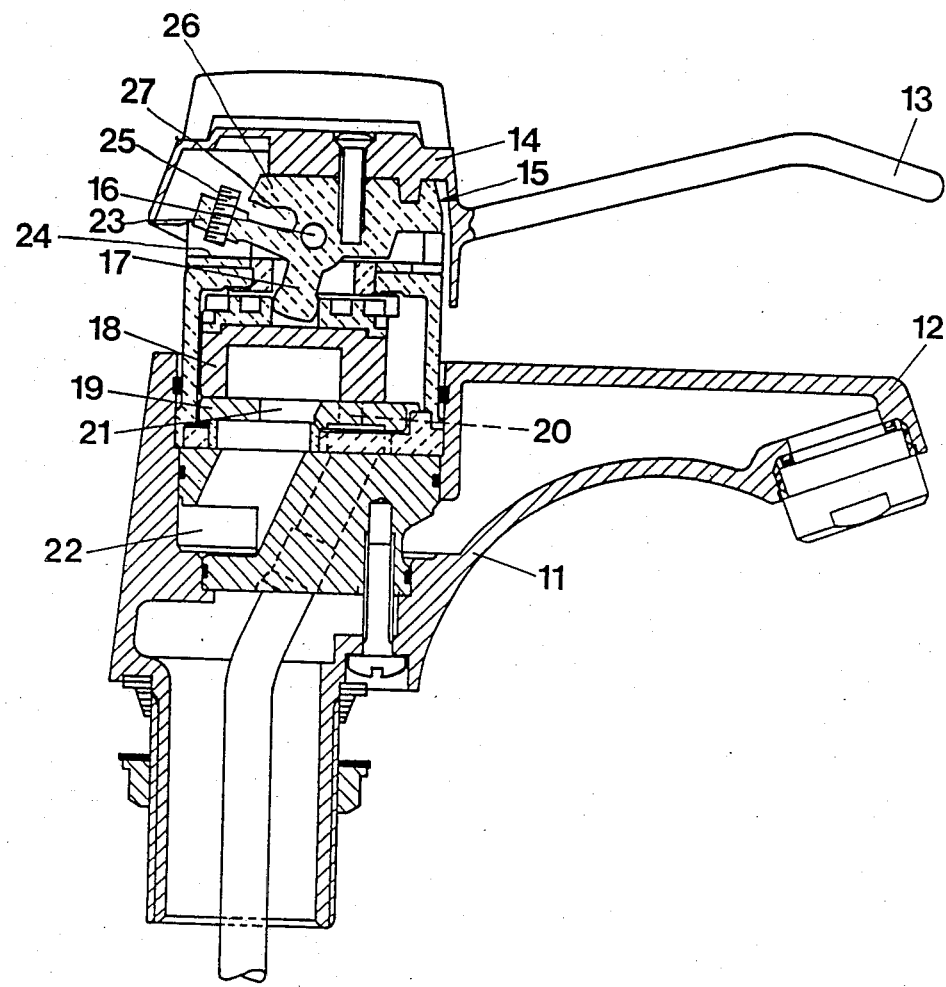

DEVICE AT MIXING VALVES

TECHNICAL FIELD

The present invention relates to a device at mixing valves for liquids for example hot and cold water, and of the kind that comprises a valve housing, which is provided with an outlet and an inlet for each of the liquids, an operating member for regulating the amount and temperature of the liquid flowing out through the outlet, the operating member being designed as a double-armed lever rotatable about a vertical as well as a horizontal axle and the longer arm of which consists of a handle extending outside the housing and the shorter arm of which consists of an actuator arranged inside the housing, arranged to co-operate with a valve member, at which said actuator is provided with a stop part co-operating with a stop face for limiting the maximum outflow of liquid.

BACKGROUND OF THE INVENTION

In the Swedish patent application No. 8101248-6, publication No. 433657 a mixing valve of the above-mentioned kind is shown. The actuator has an adjusting screw by means of which the stop position and by that the maximum outflow can be set. There is only one stop position, which can not be exceeded. It is often suitable to set the stop position relatively low, for example in order to save hot water, at which however in some cases it may be desireable to have higher flows, for example when larger amounts of water are to be filled up.

THE OBJECT AND MOST IMPORTANT FEATURES OF THE INVENTION

The object of the present invention is to provide a mixing valve of the above mentioned kind, by which it is possible to exceed temporarily the set maximum outflow. This has been achieved by the fact that said stop part consists of a resilient tongue which when tightened against the stop face is arranged to spring and permit an increase of the outflow.

DESCRIPTION OF THE DRAWING

The invention will be described below with reference to the enclosed drawing which shows an embodiment, at which a vertical section through a mixing cock is shown, for example a wash basin cock, provided with the device according to the invention.

DESCRIPTION OF THE EMBODIMENT

The mixing cock shown in the FIGURE is of the so called single lever type and comprises a valve housing 11 with spout 12 and an operating handle 13, by means of which the upper part 14 of the mixing housing is rotatable about a vertical axle for regulating the temperature of the outflow water. The upper part of the mixing housing co-operates with an actuator mounted about a horizontal axle 16.

The handle 13 can be considered as a double-armed lever, which is mounted about a vertical as well as a horizontal axle and the short lever arm of which consists of a part of the actuator 15 and actuates a moveable valve plate 18. This is fitted up against a second fixed valve plate 19, which is provided with two inlet holes 20, of which only one is seen in the figure, for cold or hot water and also an outlet hole 21, which through a passage 22 communicated with the spout 12.

The actuator 15 has a stop arm 23, which co-operates with a fixed stop face 24 for limiting the rotation of the actuator 15 about the axle 16 and the maximum outflow of the liquid through the outlet 21 therewith. The stop arm 23 has an adjusting screw 25 by means of which the stop position can be adjusted.

The stop arm 23 is resilient and can spring against a stop member 26 arranged in the actuator 15 when tightened against the stop surface 24 and by further pressing the handle 13 upwards, at which the flow can temporarily be increased further. In stop arm 23 and the stop member 26 are designed integral with the actuator 15 and are separated by means of a slit 27.

Of course the invention is not limited to the shown embodiment but can be modified within the scope of the claims. It is also applicable or other mixing valves than to the one shown here.

What is claimed:

1. A device in a mixing valve for liquids, for example hot and cold water, and of the kind that comprises a valve housing which is provided with an outlet and an inlet for each of the liquids, an operation member for regulating the amount and temperature of the liquid flowing out through the outlet, the operating member being a double-armed lever rotatble about a vertical as well as a horizontal axle, the lever having a longer arm which includes a handle extending outside the housing and a shorter arm which includes an actuator arranged inside the housing and cooperating with a valve member, said actuator being provided with a stop part co-operating with a stop face for limiting the maximum outflow of liquid, characterized in that said stop part includes a resilient tongue which when tightened against the stop face is arranged to spring and permit an increase of the outflow, the spring movement of the tongue being limited by a stop member, and the stop part and the stop member being integrated with the actuator and separated by means of a slit.

* * * * *